United States Patent [19]

Eyer et al.

[11] Patent Number: 5,801,753

[45] Date of Patent: Sep. 1, 1998

[54] METHOD AND APPARATUS FOR PROVIDING AN INTERACTIVE GUIDE TO EVENTS AVAILABLE ON AN INFORMATION NETWORK

[75] Inventors: Mark K. Eyer; Zicheng Guo, both of San Diego, Calif.

[73] Assignee: General Instrument Corporation of Delaware, Horsham, Pa.

[21] Appl. No.: 502,774

[22] Filed: Aug. 11, 1995

[51] Int. Cl.⁶ .............................. H04N 7/14; H04N 7/08; H04N 7/084; H04N 7/087
[52] U.S. Cl. .......................... 348/13; 348/17; 348/473; 348/906
[58] Field of Search ........................... 348/7, 12, 132, 348/6, 906, 569, 563, 564, 461, 467, 468, 473, 476; 395/200.47, 200.48, 200.49; 345/326, 327

[56] References Cited

U.S. PATENT DOCUMENTS

| | | | |
|---|---|---|---|
| 5,223,924 | 6/1993 | Strubbe. | |
| 5,253,066 | 10/1993 | Vogel. | |
| 5,479,268 | 12/1995 | Young et al. | 348/906 |
| 5,515,106 | 5/1996 | Chaney et al. | 348/906 |
| 5,544,161 | 8/1996 | Bigham et al. | 348/6 |
| 5,583,562 | 12/1996 | Birch et al. | 348/12 |
| 5,585,838 | 12/1996 | Lawler et al. | 348/906 |
| 5,585,931 | 12/1996 | Juri et al. | 348/109 |
| 5,592,551 | 1/1997 | Lett et al. | 348/13 |
| 5,619,250 | 4/1997 | McCellan et al. | 348/13 |
| 5,619,274 | 4/1997 | Roop et al. | 348/906 |
| 5,629,733 | 5/1997 | Youman et al. | 348/13 |
| 5,630,119 | 5/1997 | Aristides et al. | 348/13 |
| 5,659,350 | 8/1997 | Hendricks et al. | 348/13 |

FOREIGN PATENT DOCUMENTS

| | | |
|---|---|---|
| 0 300 562 A | 1/1989 | European Pat. Off.. |
| 0 679 030 A | 10/1995 | European Pat. Off.. |
| WO 94/13107 | 6/1994 | WIPO. |
| WO 94/19881 | 9/1994 | WIPO. |

OTHER PUBLICATIONS

"Program Guide Interface Document for Grand Alliance," Version 1.01, Thomson Consumer Electronics, Indianapolis, Indiana, Nov. 29, 1994.

C. Bestler, "Flexibla Data Structures and Interface Rituals for Rapid Development of OSD Application," *1993 NCTA Technical Papers*, Jun. 6–9, 1993, San Francisco, CA, U.S.A., pp. 223–236.

V. Brugliere, "Digital On–Screen Display A New Technology for the Consumer Interface," *Cable TV Sessions*, Jun. 10–15, 1993, Montreux, Switzerland, pp. 571–586.

*Primary Examiner*—Tommy P. Chin
*Assistant Examiner*—Nhon T. Diep
*Attorney, Agent, or Firm*—Barry R. Lipsitz; Ralph F. Hoppin

[57] ABSTRACT

Apparatus and methods are provided for implementing an interactive program guide on an information network. A plurality of database pages are communicated over the information network. Each page corresponds to a time slot over which events are available on the network. Schedule data for each event to be included in the interactive guide is inserted into the database page for the time slot during which the event is to be provided. The database pages are transmitted via the information network at a transmission rate selected to enable the recovery of a particular database page within a predetermined acquisition time limit, for retrieval of schedule data for the time represented by that page. Schedule information for a current time period can be provided in a trickle data stream with future scheduling information provided in a demand data stream. The demand data stream is transmitted at a substantially higher rate than the trickle data stream. Data from the trickle stream is downloaded into memory at the decoder for instantaneous display. Data from the demand data stream is accessible on an as needed basis by retrieving only that data necessary for the display of scheduling information for a desired time slot.

26 Claims, 5 Drawing Sheets

METHOD AND APPARATUS FOR PROVIDING AN INTERACTIVE GUIDE TO EVENTS AVAILABLE ON AN INFORMATION NETWORK

BACKGROUND OF THE INVENTION

The present invention relates to the provision of services over a communication network, and more particularly to an interactive guide to individual events available via an information network. The invention has particular applicability to the provision of an interactive program guide for events (e.g., television programs, movies, concerts, sporting events, interactive forums, and the like) available over a satellite or cable television network.

The availability of digital networks for the transmission of games, information services, television programming (including movies and special events), shop at home services, and the like, has vastly increased the number and variety of such services available to consumers. Systems with 500 or more programming channels are contemplated and are expected to be in operation in the near future. One challenge that has emerged in the development and design of such systems is how to keep consumers informed as to the scheduling of the many different events that are offered.

In the past, where cable and satellite television systems have generally provided less than 100 channels, weekly or monthly program guides have been printed and distributed by mail. Periodical publications, such as TV Guide, have been available for purchase at newsstands or by subscription. Obviously, any schedule changes made after the printing of the program guides will render such printed guides inaccurate. Further, for the contemplated systems of 500 or more channels, the sheer volume of entries renders the use of printed program guides expensive and inconvenient to use. The indexing of the large number of programs is a complex task and a consumer's search for a desired program may be extremely inconvenient.

A logical solution to the problem of providing an accurate, up-to-date guide for a large number of events is to provide the guide via an electronic medium. The communication industry is working toward the development of program guides that are downloaded to a subscriber terminal, such as a "set top box" connected to a subscriber's television, in order to provide program schedule information. One stumbling block in implementing such an electronic program guide is the amount of bandwidth required to carry the large amount of scheduling information over a communication channel. Another obstacle is the amount of memory required to store scheduling data for a week or more within the set top box. Such random access memory (RAM) is currently expensive. This conflicts with the requirement that a consumer set top box be a relatively inexpensive item.

Another problem faced by developers of electronic guides to events available over a communication network is the provision of the schedule information in a timely manner. Subscribers would grow impatient if the response time for providing scheduling information in answer to a query for such information for a particular time slot takes too long. In an ideal system, a subscriber would receive an immediate answer to a request for scheduling information pertaining to a particular time period. After obtaining scheduling information, a subscriber may desire to have further details about a particular program. Again, it would be inconvenient to wait for more than a few seconds in order to obtain descriptive information about a program. Ideally, the description information should be provided almost instantaneously after a request therefor.

It would be advantageous to provide an interactive guide to events that is economical in terms of both communication bandwidth and cost. It would be further advantageous to provide such an interactive guide that responds to user inquiries on an instantaneous or near instantaneous basis. It would be still further advantageous to provide an interactive service guide that can be received by a relatively inexpensive set top box, and which adapts to the amount of RAM available in a particular set top box. The method for providing the interactive service guide should enable more advanced set top boxes having more memory to respond to requests for schedule and description information even more rapidly than boxes having less memory.

The present invention provides a method and apparatus for implementing an interactive guide to events enjoying the above and other advantages.

SUMMARY OF THE INVENTION

In accordance with the method of the present invention, an interactive guide to events is provided via an information network. The interactive guide can be provided on the same network on which the events described by the guide are available. A plurality of database "pages" is provided for communication over the information network. Each page corresponds to a particular time slot, and includes data defining the titles of events offered during the time slot to which that page pertains. The pages may optionally include descriptions of the events. Thus, for each event that is to be included in the interactive guide, schedule data is inserted into the database page for the time slot(s) during which that event is to be provided. The database pages are transmitted via the information network at a transmission rate selected to enable the recovery of a particular database page within a predetermined acquisition time limit, for retrieval of schedule data for the time slot represented by that page. The predetermined acquisition time limit is selected to provide requested schedule information without undue delay as perceived by users of the system.

The schedule data can be representative of information services and messages identifying events provided by particular information services at particular times. The method can comprise the further step of sorting the schedule data by information service and message type for insertion into the database pages in a preformatted form. The schedule data is transmitted in the preformatted form to facilitate the display of schedules by time slot at a decoder without performing the sorting at the decoder.

In an illustrated embodiment, the transmitting step transmits the database pages in a packetized transport stream in which different categories of data are carried in different packet streams. Each packet stream has a unique packet identifier (PID). The database pages are carried in at least one packet stream identified by a unique PID. In one embodiment, each of the database pages is carried in a separate packet stream having an unique PID for that page. An additional data stream can be provided containing foundation data necessary to decode the schedule data carried in the database pages. The additional data stream has its own PID.

The database pages can contain schedule data for time periods beyond a current time period. For example, they can contain data for a week or more beyond the current day. In a preferred embodiment, a separate stream of data is provided with schedule information for the current time period, e.g., the current day. The separate stream has its own PID and provides the schedule information for the current time period at a rate which is slower than the rate at which the schedule data carried in the database pages are provided. More particularly, the data for the current time period may be provided in a "trickle data stream," the data from which is stored in the RAM of a subscriber set top box or the like. The data for future time periods is carried in a "demand data stream" which carries the data at a much higher rate, for retrieval on a real time basis in response to a request for future scheduling information from a subscriber. Since the RAM available at the subscriber location will typically be less than that available to store all of the future schedule information, the provision of a separate high rate demand data stream in accordance with the present invention enables desired scheduling data to be retrieved without undue delay. The storage of current scheduling data in RAM enables the current data to be substantially instantaneously retrieved and displayed in response to a subscriber's request.

For each event to be included in the interactive guide, the schedule data can comprise a title record containing title information for that event and may optionally comprise a description record containing description information for that event. In this manner, the description information for an event can be processed at a decoder independently of the title information for that event. The insertion of the title and description records within the database pages can be allocated to communicate the title information at a higher rate than the description information. The title and description records for a time slot of interest may be stored in the memory of the decoder (e.g., a subscriber's set top box). The amount of memory available for storing the records can be monitored. In the event that the amount of memory available is less than that required to store the title and description records for a time slot of interest, description records can be purged to make room for the title records.

The schedule data can further comprise a schedule record for the time slot to which the schedule data pertains. The schedule record contains title and description record identifiers cross-referencing the start time for an event with the title and description records for that event. A decoder is disclosed that provides an interactive program guide (IPG) from data received via an information network on which events listed in the program guide are available. The decoder includes means for recovering IPG trickle data from the information network at a first data rate. The trickle data comprises current schedule information for storage in a decoder memory and substantially instantaneous display at any time during a current time period. Means are provided for selectively retrieving IPG demand data from the information network at a second data rate that is substantially faster than the first data rate. The demand data is provided in pages and comprises future schedule information. Each of the pages contains demand data for different future time slots. Means are provided for storing selectively retrieved pages of IPG demand data for display after the retrieval thereof from the information network.

The IPG trickle data and IPG demand data can be received from at least one packetized transport stream containing a succession of packets. The packets for the trickle data are identified by a first packet identifier (PID) and the packets for the pages of demand data are identified by at least one second PID. In one disclosed embodiment, each of the pages of IPG demand data corresponds to a different time slot and has a unique PID. Each such page of IPG demand data can alternatively have a unique page identifier, with a plurality of the pages being communicated under a common PID.

For each event to be included in the interactive guide, the schedule information can comprise a title record containing title information for that event and may optionally comprise a description record containing description information for that event. The decoder can further comprise means for retrieving schedule records from the current and future schedule information. The schedule records contain title and description record identifiers cross-referencing the start time for an event with the title and description records provided for that event. Means responsive to a user input are provided for selectively outputting title information for specific time slots and descriptions for specific programs based on information contained in the schedule records.

The decoder can further comprise means for monitoring an amount of memory available in the storing means. In the event that the amount of memory available is less than that required to store the title and description records for a time slot of interest, the description records can be purged to make room for the title records in the storing means. The decoder memory is preferably of a size sufficient to hold at least 24 hours of current schedule information. The trickle data can then provide schedule information for at least a full day of events at a time.

As noted above, each of the pages can be carried in a separate packet stream having a unique PID for that page. In such an instance, the decoder can further comprise a first PID processor for acquiring schedule information contained in a first page for a first time slot. A second PID processor can be provided for acquiring schedule information contained in a second page for a second time slot that immediately follows the first time slot. Means are provided for selectively combining a portion of schedule information acquired by the first PID processor with a portion of schedule information acquired by the second PID processor to provide a schedule of events available during a time period spanning the first and second time slots.

A method is disclosed for providing an interactive program guide from data received via an information network on which events listed in the program guide are available. An IPG trickle data stream is provided at a first data rate. The trickle data stream comprises current schedule information for communication to and storage in a decoder. The trickle data stream enables instantaneous display of portions of the current schedule information on a display coupled to the decoder. An IPG demand data stream is provided at a second data rate that is faster than the first data rate. The demand data is provided in pages and comprises future schedule information. Each of the pages contains demand data for at least one different future time slot. The second data rate is chosen to enable the selective acquisition and display of portions of the future schedule information on the display within a predetermined acquisition time limit. The trickle data stream is transmitted at the first rate and the demand data stream is transmitted at the second rate over the information network for receipt by a population of decoders.

The current and future schedule information can be representative of information services and messages identifying events provided by particular information services at particular times. The method comprises the further step of sorting the schedule information by information service and message type for transmission to the decoders in a preformatted form. This facilitates the acquisition and storage of schedules by time slot at the decoders without performing the sorting at the decoder.

For each event to be included in the interactive guide, the schedule information can comprise a title record containing title information for that event and may optionally comprise a description record containing description information for that event. The description information for an event can then be processed at the decoders independently of the title information for that event. The method can comprise the further step of allocating the transmission of the title and description records within the demand data stream to communicate the title information at a higher rate than the description information.

DETAILED DESCRIPTION OF THE INVENTION

Figure 1:
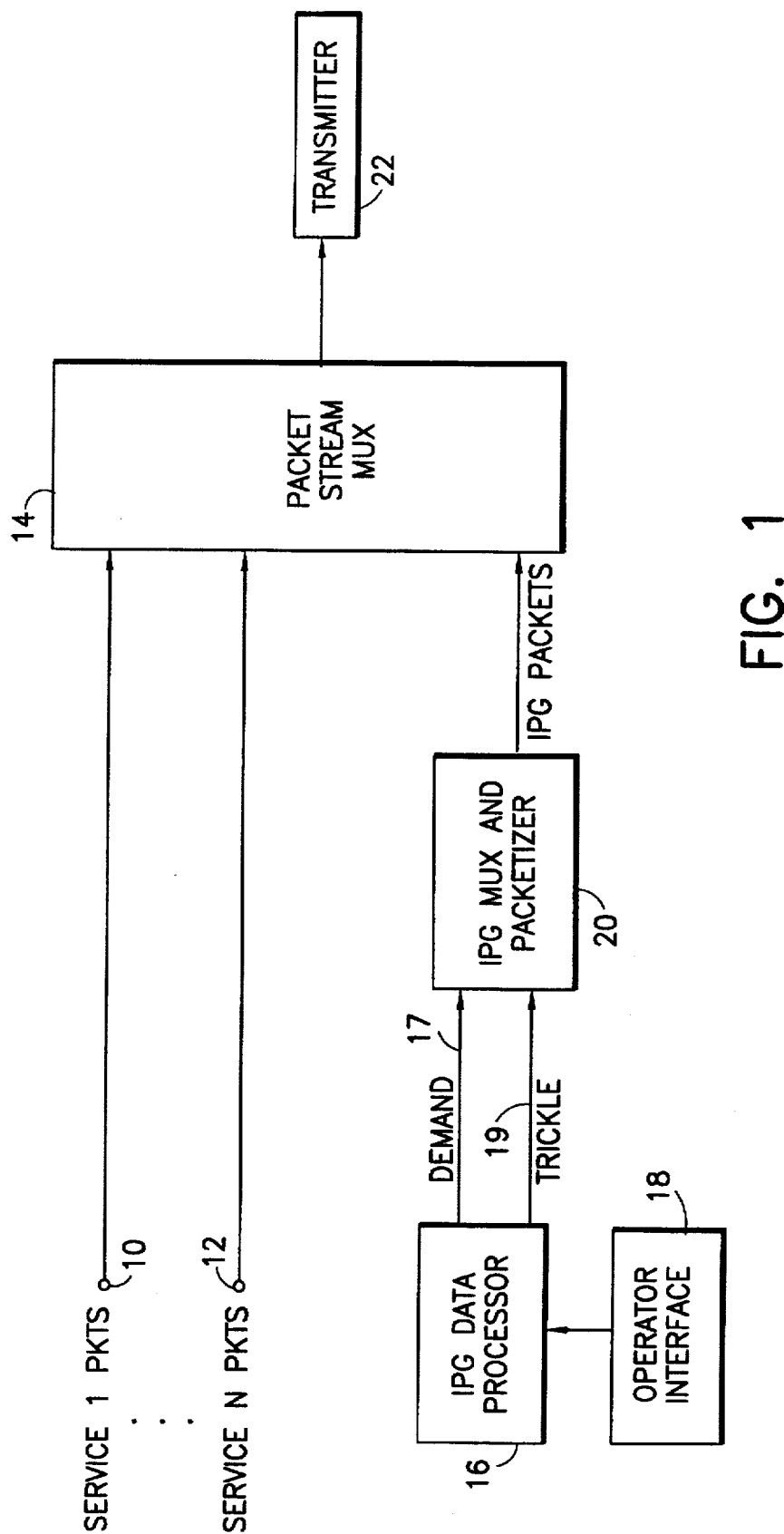
FIG. 1 is a block diagram of various elements necessary to generate an IPG packet stream in accordance with the present invention.

FIG. 1 is a block diagram of encoder apparatus for assembling and transmitting interactive program guide (IPG) packets in a multiplex with various services to be provided over a communication network. A packet stream multiplexer 14 receives data packets for N different services that are input to the multiplexer via a plurality of terminals 10, 12. IPG packets are also input to the packet stream multiplexer 14 for multiplexing with the data packets for the different services. The services can provide, for example, events such as television programs (e.g., via a network service), movies (e.g., via the HBO service), special sports events, shop at home services, information services, interactive forums, town meetings, and any other type of service available electronically via a communication network. The packet stream multiplex output from multiplexer 14 is transmitted over the communication network by a conventional transmitter 22. The communication network can comprise, for example, a satellite communication network, a cable television network or a telephone network.

IPG data is input to an IPG data processor 16 via an operator interface 18. The operator interface can comprise a workstation having a keyboard through which an operator inputs various scheduling information. Other input devices, such as optical character readers and voice recognition systems can also be used to input scheduling information to the IPG data processor. The scheduling information is typically organized by time slots within a particular day. The time slots can be any size, for example two, four, six, eight or 12 hours. For each event, a title can be provided together with the time at which the event is available. A description of the event can also be provided as part of the IPG data input via the operator interface.

The IPG data processor outputs both a demand data stream 17 and a trickle data stream 19. The trickle stream is a low rate IPG stream that is used to improve the responsiveness and user friendliness of the program guide function by ensuring that the memory in a subscriber's decoder always holds a database which is up-to-date for current programming. Such an approach makes a "mini-guide" display option possible, where a partial program guide is displayed over a small portion of a user's television screen while the rest of the screen continues showing television programs or other available services. Whenever a user desires to view a portion of the program guide database that is not stored in the decoder memory, the desired portion is acquired from the high speed demand stream. Thus, trickle data does not need to be present for programs scheduled farther in the future than can be held in the available decoders having the largest IPG RAM allocation. All other data is provided via the demand stream.

To simplify implementation, it is preferable for the trickle stream to be formatted and constructed the same as the demand stream(s). Data blocks received from the trickle stream are filtered in firmware at the decoder to reject those representing data farther in the future than the particular decoder's RAM can hold. It is also preferable to provide only one trickle stream per multiplex, with all of the current scheduling data being carried in that single stream. The demand data, on the other hand, may be provided in a plurality of different data streams carried in the multiplex output from packet stream multiplexer 14.

The trickle and demand streams are multiplexed together and packetized in an IPG multiplexer and packetizer 20. The resultant IPG packets are input to the packet stream multiplexer 14 and combined with the packets for the various services carried in the transmitted multiplex, as indicated above.

By providing the most current schedule information (e.g., the schedules for the current day) in the decoder RAM, this information can be retrieved by a user without delay once the RAM has been loaded. The remaining data in the schedule database, i.e., the demand data, must be retrievable with as small a delay as reasonably possible within the constraints of system cost and complexity. Thus, if a user selects a time period of interest in the future, he must be able to see the program grid for the future time period (containing the schedule of events for that time period) in as short a time as possible. This time should not exceed several seconds. The program description information should be available no more than several seconds later (e.g., one to three seconds) for programs whose titles are visible on the screen. The necessary low acquisition time requires the delivery of IPG data not already stored in RAM at a high transmitted rate.

Even at high aggregate data rates (for example, in excess of one million bits per second-Mbps), the decoder must be able to keep up with the processing of messages received into its buffers. In a preferred embodiment, aggregate rates as high as four Mbps are provided.

The system of the present invention meets the objectives set forth above by addressing pages by time slot, filtering data slots and pages using firmware and/or hardware filtering, providing multiple PIDs to simplify the filtering required, delivering the data in a preformatted manner, and using separate data blocks to communicate title information and program description information. Data associated with timed events is page addressed, with the page number identifying a time slot. Timed events include substantially all of the data in the database except for foundation data. The foundation data is necessary to control the processing of the IPG functions, and includes compression (e.g., Huffman) code tables necessary to decompress title and description text, channel name tables, and various well known data required to properly process the packetized data stream to recover the information carried thereby.

Time slots are numbered sequentially in the preferred embodiment, e.g., starting at day zero of the global positioning satellite (GPS) time reference as well known in the art. Virtually any time slot size can be used. However, slot sizes of two, four, six, eight, twelve or twenty-four hours are preferable to simplify processing. The slot size for the trickle IPG data may be different than that used for the demand IPG data.

The IPG packets can be packetized using either a few PIDs or many PIDs. Firmware filtering is best suited for implementations using many PIDs, each carrying a few pages. Hardware filtering can efficiently handle many pages being carried on a few PIDs. If enough PIDs are available so that only one IPG data page is assigned to one PID, then only PID filtering is necessary to acquire the page(s) and associated time slot(s) of interest. If several pages are carried on each PID, firmware filtering can be performed after PID filtering, based on a unique page identifier for each page carried under the PID. In an example embodiment, where two hour time slots are provided and one week of schedule data is offered, a total of 85 PIDs may be supplied. Eighty-four of the PIDs are used for the 84 two hour time slots in a week (seven days=168 hours) with one additional PID being provided for the foundation data. In such an embodiment, since each page has its own PID, no page filtering is required at the decoder.

The decoder of the present invention delivers the schedule data in a preformatted form. Although a decoder could be designed to accept and process individual database messages, such as daily schedules, title schedules and records, description schedules and records, etc., this approach would require substantial bandwidth overhead to deliver message headers and the like. Further, the requirement for such overhead would result in shorter message sizes, thereby creating additional processing overhead in the encoder and decoder. At the same time, the processing time to handle each message could limit the delivery rate, which would increase the acquisition time.

By delivering data to the decoders in preformatted blocks, efficient processing is provided, memory management waste is reduced, access time is reduced, and memory management is simplified. More particularly, by preformatting the schedule data at the transmitter side, operations such as sorting the data need only be performed once at the transmitter, and not at each of the millions of decoders that receive the IPG data. In addition to presorting the data, the IPG data is preformatted to provide relatively long messages (e.g., in one kilobyte segments) which are easier to process at the encoder where the streams are created as well as easier and faster to process and store in the decoder. By providing long messages, the decoder only needs to perform block copy operations necessary to construct a memory image, in order to keep up with the incoming flow of portions of the IPG database. Long messages also enable large blocks of memory to be allocated at the decoder, minimizing the overhead associated with the dynamic allocation of memory blocks. Processing time at the decoder is further reduced by allocating a large block of RAM for each of the large data blocks. No further central processing unit (CPU) overhead is required above that used to collect the memory image.

The delivery of preformatted IPG data to the decoders also enables entire blocks of IPG data to be purged from the decoder memory once the time slot associated with the data block has passed. Further, if the decoder RAM is running low, description data (as opposed to title data) can be purged, one slot at a time. The resulting RAM is left with large holes, rather than lots of small holes (i.e., fragmentation) that would slow the retrieval of the IPG data from the memory.

In the method and apparatus disclosed herein, the preformatted IPG data blocks are delivered to the decoders for direct storage in RAM. Moreover, the description records are logically separated from daily schedules and title records. This serves two purposes. First, the description records are large. In some instances, the decoder will not have enough RAM to hold descriptions for one or more time slots. Second, the description records can be distributed at a slower rate than the schedule and title records. This will enable the schedule and title records to be displayed very quickly, with a short wait, if necessary, for the description records.

An example of the format that can be used for the preformatted IPG data blocks is provided in Table 1, which sets forth the data block format in a C-language-like syntax that is a method of describing continuous and possible variable rate sequences of bits, instead of specifying a procedural program and its functions as in the computer language C. The first column of the syntax contains the syntax element. The second column gives the length of the syntax elements in bits. The third column of Table 1 gives the length of the syntax elements in bytes. The last column in Table 1 describes the information carried in various bits of the syntax element. The header "IPG_data_block( ){. . .}" indicates that the syntax elements within the braces are a named set and may be invoked elsewhere in the syntax by simply using the designation "IPG_data_block( )". A conditional occurrence of bit structures may be indicated with the usual "if" tests. The customary relational operators well known in the C-language are also available. Loop structures are possible and use the standard C loop header syntax. The syntax table is accompanied by a set of semantics, providing definitions for each previously undefined syntax field and placing constraints on their use. Five types of data blocks are defined, namely, schedule_listings, descriptions, common_listings, common_descriptions, and foundation data. The following IPG prelinked record structure format represents a preferred embodiment of the present invention:

TABLE 1

| IPG_data_block( ){ | Bits | Bytes | Bit Number/Description |
|---|---|---|---|
| block_type_byte | 8 | 1 | |
| reserved | 4 | | 7–4: reserved |
| block_type | 4 | | 3–0: {foundation, common_listings, common_descriptions, schedule_listings, descriptions, rsvd1..N} |
| version | 8 | 1 | range 1–255 |
| if(block_type==foundation) { | | | |
| slot_sizes_field | 24 | (3) | |

TABLE 1-continued

| IPG_data_block( ){ | Bits | Bytes | Bit Number/Description |
|---|---|---|---|
| reserved | 12 | | 23–12: reserved |
| common_block_time_slot_size | 4 | | 11–8:{_2,_3,_4,_6,_8,_12,_24,_48, _168, rsvd1. .N} |
| trickle_block_time_slot_size | 4 | | 7–4:{_2,_3,_4,_6,_8,_12,_24, rsvd1. .N} |
| demand_block_time_slot_size | 4 | | 3–0:{rsvd1, rsvd2,_4,_6,_8,_12, _24, rsvd3. .N} |
| }else{ | | | |
| date | 16 | (2) | start of time period covered, days |
| time | 8 | (1) | start of time slot, hours since mid. |
| } | | | |
| bundle_ID | 8 | 1 | range 0–255 |
| reserved | 8 | 1 | |
| data_block_length | 24 | 3 | units: bytes |
| for(i=0; i<N; i++){ | | | |
| is_a_group_byte | 8 | (1) | |
| is_a_group | 1 | | 7: {no, yes} |
| reserved | 7 | | 6–0: reserved |
| offset_to_next_group_or_source | 24 | (3) | 0 indicates end of block |
| if(is_a_group){ | | | |
| reserved | 8 | ((1)) | |
| group_ID | 8 | ((1)) | |
| }else{ | | | |
| source_ID | 16 | ((2)) | |
| } | | | |
| for(i=0; i<M; i++){ | | | |
| offset_to_next_message_type | 24 | ((3)) | 0 indicates end of channel |
| message_type_ID | 8 | ((1)) | |
| for(i=0; i<P; i++){ | | | |
| long_message | 1 | | {no, yes} |
| if(long_message) { | | | |
| message_length | 15 | ((2)) | (L) L = 0 indicates end of group |
| }else{ | | | |
| message_length | 7 | ((1)) | (L) L = 0 indicates end of group |
| } | | | |
| message_body( ) | 8*L | ((L)) | |
| } | | | |
| word_alignment | 0–8 | ((0–1)) | |
| } | | | |
| word_alignment | 0–8 | (0–1) | |
| } | | | |
| } | | | | block_type: A 4-bit enumerated type field which identifies the type of IPG data block. The following C code defines the enumeration:

```
enum block_type {foundation, common_listings, common_descriptions,
sched_listings, descriptions, reserved1. .N};
``` version: An 8-bit unsigned integer value in the range 1–255 which reflects the version or revision of the data contained in the block. Each time the database is updated (e.g., as a result of program changes, deletions or additions) a new version of the data block covering the affected time slot is generated.

foundation: The block contains untimed data (foundation data) rather than time-related data. The foundation type allows the same data block format to be used for untimed data, such as the compression tables, program theme classes, and channel names.

common_listings: The block contains a single copy of each repeated program listing whose first occurrence is in the common_block_time_slot covered by the common_listings block. A repeated program listing is defined as a listing that is shown more than once, within the trickle database lookahead, either on an affiliated group of channels or on a single channel which does not belong to any group. No such listing shall be included in any schedule_listing block (see below). This block type applies to trickle data only.

common_descriptions: The block contains a single copy of each repeated program description whose first occurrence is in the common_block_time_slot covered by the common_descriptions block. A repeated program description is defined as a description that is shown more than once, within the trickle database lookahead, either on an affiliated group of channels or on a single channel which does not belong to any group. No such description shall be included in any description block (see below). This block type applies to trickle data only.

schedule_listings: The block contains daily schedules and program listings specific to each time slot. For trickle data, these listings correspond to single-show programs—those which are shown only once within the lookahead.

descriptions: The block contains program descriptions specific to each time slot. For trickle data, these descriptions correspond to single-show programs—those which are shown only once within the lookahead.

common_block_time_slot_size: A 4-bit enumerated type field which defines the time slot size in hours for common_listings and common_descriptions blocks. The slot size for these common data blocks shall be selected so that it is an integer multiple of, or equal to, the slot size used by the trickle data blocks. The following C statement defines the enumeration:

```
enum common_block_time_slot_size {two_hours, three_hours,
    four_hours, six_hours, eight_hours, twelve_hours,
    twenty_four_hours, forty_eight_hours
    one_hundred_sixty_eight_hours, reserved1. .N};
``` trickle_block_time_slot_size: A 4-bit enumerated type field which defines the time slot size in hours for the trickle schedule_listing and description blocks. The following C statement defines the enumeration:

```
enum trickle_IPG_time_slot_size {two_hours, three_hours,
    four_hours, six_hours, eight_hours, twelve_hours, twenty_four_hours,
    reserved1. .N};
``` demand_block_time_slot_size: A 4-bit enumerated type field which defines the time slot size in hours for the demand schedule_listing and description blocks. The following C statement defines the enumeration:

```
enum trickle_IPG_time_slot_size {reserved1, reserved2, four_hours,
    six_hours, eight_hours, twelve_hours, twenty_four_hours,
    reserved3. .N};
``` time: An unsigned integer in the range 0 to 23 which represents the hour in the day which is the starting point for data defined in this block. The time field is ignored for foundation data blocks.

date: An unsigned integer in the range 0 to 0xFFFF, representing the day for which schedule data is carried in the block. Day zero is Jan. 6th, 1980 (GPS day zero). The date field is ignored for foundation data blocks.

bundle_ID: Channels are logically divided into "bundles" to efficiently accommodate different channel configurations at the set-top units. The bundle_ID is an 8-bit unsigned integer in the range 0 to 255 identifying each bundle of source channels and groups. The value 0 defines the "common bundle" which includes channels common to all configurations; while other values of bundle_ID identify configuration specific bundles. Typically, a set-top converter requires bundle 0 and one or more other bundles for its configuration.

data_block_length: A 24-bit count of the number of bytes to follow in the block.

offset_to_next_group_or_source: A 24-bit number representing the distance in bytes to the next group of source channels or the next source channel, i.e., the length of all data to follow for the specified group_ID or source_ID. This field is ignored for the foundation blocks.

group_ID: The identity of the affiliated channel group to which the messages to follow apply. When is_a_group is set, the listing and description record IDs are shared among all the source channels in the group. This field is ignored for the foundation block.

source_ID: The identity of the channel to which messages to follow apply. The source_ID uniquely defines the channel's identity. This field is ignored for the foundation blocks.

offset_to_next_message_type: A 24-bit number representing the distance in bytes to the next type of messages.

message_type: The IPG message type common to all messages to follow.

long_message: A Boolean flag which indicates, when set, that the message length is a 15-bit field. When clear, the message length field is 7 bits.

message_length: A 7 or 15-bit field defining the length of the message body to follow.

message_body( ): The body of one given IPG message. The header portions are not stored, but their contents are reflected in fields such as the group_message_type and message length.

word_alignment: These fields supply from zero to one byte of padding, used to bring the particular part of the block to a word boundary, for processing and addressing efficiency.

The following are examples of IPG message types that can be provided:

attribute name, class name, named class assignment, sortable class assignment, sortable subclass assignment, translation table, decode table, clear data, database lookahead, source name, schedule record, program title, program description, program package, pay-per-view program, etc.

Figure 3:
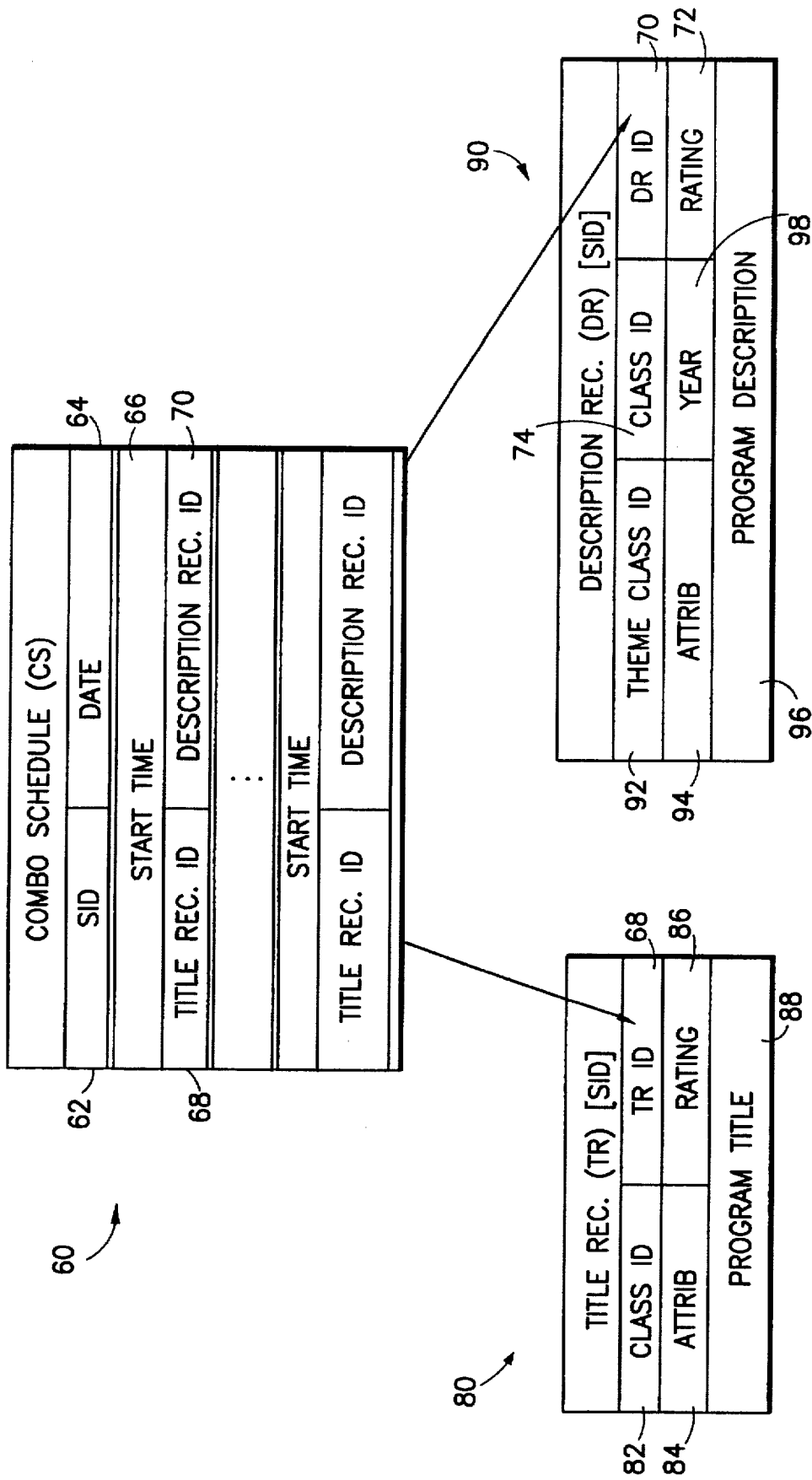
FIG. 3 is a diagrammatic illustration showing a preferred method of communicating schedule information including title records and description records.

An example of the structure of one particular IPG message type, namely the schedule record, is provided hereinafter in the discussion of FIG. 3.

As is evident from Table 1, messages are sorted first by channel number (source_ID) and then by message type. The innermost loop lists a number of messages in a "group" of messages having a common message type.

The prelinked demand IPG data blocks are delivered as high speed messages in multiple PIDs. Prior to transmission, the data blocks can be formatted into text messages and encapsulated within transport frames (e.g., high level data link control-"HDLC"-frames) for output from a serial output port for eventual transmission.

The IPG_data_block ( ) itself is transported to the decoder in a manner that is compatible with the delivery of digital services on a digital multiplex. In an MPEG-2 compatible system, of which the preferred embodiment is an example, the IPG_data_block ( ) is placed inside a message header which includes message type (MPEG Table_ID) and length. The whole message is packetized according to the packetization rules defined for MPEG-2 multiplexes and delivered in a PID stream referenced by an MPEG "Program Map Table" (PMT).

Another function of the message header is to provide segmentation control. Typically, one particular instance of an IPG_data_block ( ) is larger than 1024 bytes and thus may have to be segmented for delivery.

Figure 2:
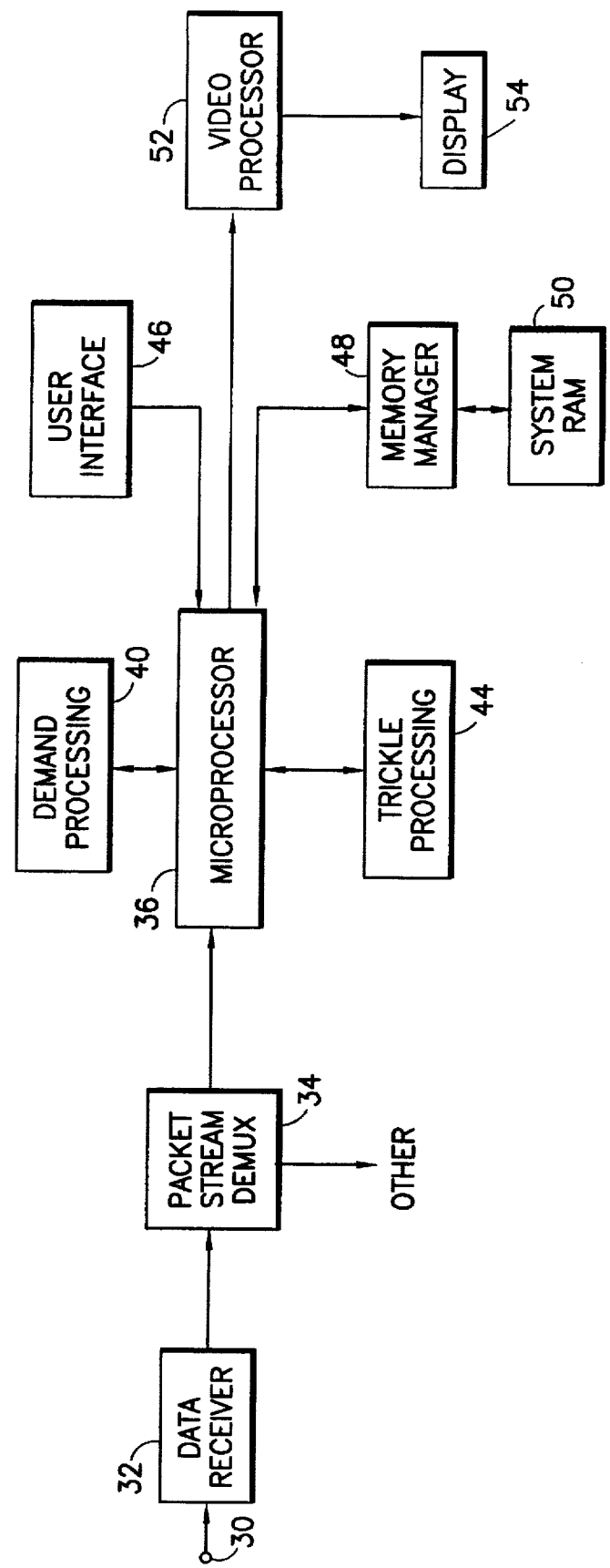
FIG. 2 is a block diagram of apparatus for receiving and decoding IPG data.

The transmitted messages are received by a population of receivers via the communication channel which can comprise, for example, a satellite link or cable television distribution path. A block diagram of the pertinent portions of an example receiver implementation is provided in FIG. 2. A data receiver 32 receives the transmitted data stream via an input terminal 30. The received data is provided to a packet stream demultiplexer 34 that outputs the demand and trickle IPG data packets to an IPG microprocessor 36. Other packets in the transport stream, which may include video and audio packets, are also output from the packet stream demultiplexer 34.

Microprocessor 36 separately processes the demand and trickle data streams. Demand processing is provided as indicated at 40, at a rate established by the incoming data products. Trickle processing is provided as indicated at 44, at a rate determined by the incoming trickle data. In a preferred embodiment, the demand processing occurs at a much higher rate than the trickle processing. For example, the data rate for the demand stream will be on the order of 1-2 Mbps, while the data rate of the trickle stream will be on the order of ten kilobits per second (Kbps). Since the trickle data is stored locally in the receiver's memory, there is no need for it to be provided in a high rate data stream as it will be instantly accessible from the decoder RAM.

Loading of the trickle data as well as selective portions of the demand data into system RAM 50 is controlled by a memory manager 48 coupled to microprocessor 36. The memory manager will address the RAM 50 in a conventional manner to store the trickle and demand data for subsequent retrieval by the microprocessor and display on a monitor 54 or the like coupled to a video processor 52. Selection of particular time slots of future scheduling information carried in the demand data stream is made via a user interface 46. The user interface can comprise, for example, a remote control coupled to input instructions to microprocessor 36 in a well known manner.

One function of memory manager 48 is to monitor the amount of free memory available in the system RAM 50. In the event that the amount of memory available is less than that required to store the title and description records for a time slot of interest, the memory manager can purge description records from the system RAM in order to make room for all of the title records. In this manner, the title information will be immediately available to a user once it has been downloaded into the system RAM. If there is not enough room to store the corresponding description information, the description record for an event requested by a user can be obtained from the demand data stream on an as needed basis. Since the demand data is transmitted at a high rate, the acquisition time for a requested description not already stored in system RAM 50 will be fairly short.

Preferably, the amount of system RAM 50 allocated for IPG data will be enough to hold at least 24 hours of current schedule information. Thus, schedule information for at least a full day of events at a time can be accommodated. In the preferred embodiment, all of the scheduling information for at least the current day's events will be provided in the trickle data stream for downloading into system RAM 50.

In an embodiment wherein the data carried by the demand and trickle streams is provided in separate pages, and each of the pages is carried in a separate packet stream identified by a unique PID in the transport multiplex, microprocessor 36 can provide first and second PID processors for acquiring schedule information spanning two consecutive time slots. The separate PID processors could be implemented in either hardware or firmware. The first PID processor will acquire schedule information contained in a first page for a first time slot. The second PID processor will acquire schedule information contained in a second page for a second time slot that immediately follows the first time slot. The microprocessor will selectively combine portions of schedule information acquired by the first and second PID processors to provide a schedule of events available during a time period spanning the first and second time slots. The combined schedule is output to video processor 52 for display on display 54.

In order to simplify the processing provided by microprocessor 36, a service carried on the information network can be divided among a plurality of different data streams, each having its own PID. Processing is simplified in such an embodiment because the individual data rates are smaller. At higher data rates, hardware filtering may also be required.

There are two different types of elementary PIDs which make up the demand IPG download service. One type carries only records describing time slots. The other type carries foundation data. The records describing time slots include daily schedule/title records and description records. In a preferred embodiment of the present invention, the records describing time slots are carried in the form of a "schedule record" that combines title and description information into a daily schedule. An example of such an IPG data record structure is illustrated in FIG. 3. It should be appreciated that many other message types are transmitted in a similar manner.

A schedule record generally designated 60 is identified by source_ID (SID) 62 and date 64. This information is not stored in the message body portion of the IPG data block carrying the record, since it can be found within the header portions of the block at various levels. Schedule records are transmitted in the form of N blocks (one block per time slot), each block defining all title and description records via title record IDs 68 and description record IDs 70, indexed by the start time 66 for the particular program or event. Each of the N blocks contains the title and description information for all events within a particular time slot.

Each title record 80 contains compressed text defining the title of the program or event. The title record also includes a class ID 82, title attributes 84 and a rating 86. Class IDs 82 provide a set of sortable theme classes and theme subclasses for use in selecting schedule categories by a particular theme, such as sports, movies, comedy, etc. They can also be used, e.g., to identify the record as a title record, or to identify a service as a pay-per-view or non-pay-per-view event. Title attributes are used to represent various text messages in a compressed form. For example, a plurality (e.g., 12) attribute bits may be provided, each representing a different message relating to the events provided. For television programs, example messages that can be indicated by different attributes are "stereo," "premier," "rerun," "series," "special event," etc. Ratings 86 are taken from the standard ratings for movies and are used as guidelines as to the nature of the movie's content. The actual program title 88 is also provided in the title records 80.

Description record 90 comprises a theme class ID 92, description attributes 94, the actual program description 96 (which may be compressed) as well as the year 98 in which the program was first released. Rating information 72 and a class ID 74 is also provided in the description record. The description attributes can be the same as or different from the attributes in the title records. The theme class ID is like the class ID of the title record, and identifies the type of event, such as sports, movies, comedy, talk show, children's program, etc. The class ID identifies the record as a description record. The structure of the title and description records makes it possible to convey information in a service database to the system users in an extremely versatile manner.

Table 2 sets forth the structure of the schedule record in detail. The shaded areas of Table 2 are not stored in the message body portion of the IPG data block, since they can be found within the header portions of the block at various levels. Further, the daily_schedule message can include title/description references for an entire day or any portion of a day. Thus, the schedule record structure can handle any desired slot size.

TABLE 2

| daily_schedule_message() { | Bits | Bytes | Bit Number/Description |
|---|---|---|---|
| group_schedule_byte | 1 | 1 | |
| reserved | 7 | | 7-1: reserved |
| group_schedule | 1 | | 0: {no, yes} |
| if (group_schedule){ | | | |
| reserved | 8 | (1) | |
| group_ID | 8 | (1) | |
| } else { | | | |
| source_ID | 16 | (2) | |
| } | | | |
| schedule_date | 16 | 2 | days |
|   number_of_entries_field | 8 | 1 | |
|     reserved | 2 | | 7-6: reserved |
|     number_of_entries | 6 | | 5-0: range 0-63 |
|   for(i=0; i<number_of_entries; i++){ | | | |
|     program_listing_reference | 24 | (3) | |
|       listing_ID | 12 | | 23-12: |
|       description_present | 1 | | 11: {no, yes} |
|       start_time | 11 | | 10:0: min. since midnight |
|     if (description_present is set){ | | | |
|       description_ID_reference | 16 | ((2)) | |
|         reserved | 4 | | 15-12: |
|         description_ID | 11 | | 11-0: |
|     } | | | |
|   } | | | |
| } | | | |

When group_schedule is set, the schedule is assigned to a group of sources, instead of a single source. When group_schedule is false, and the source belongs to an affiliated group, the daily schedule is an exception schedule; i.e., the daily schedule defines the differences between the source's schedule and the base-line group schedule. When group_schedule is false, and the source does not belong to an affiliated group, then the schedule uniquely defines the day's programming for the independent source.

group ID specifies the identity of the group to which the daily schedule is assigned.

source_ID specifies the identity of the source to which the daily schedule is assigned.

schedule date specifies the calendar day (day 0=Jan. 6, 1980) of the daily schedule.

number of entries specifies the number of programs referenced by the daily schedule.

listing_ID identifies the program listing shown at the given start_time.

description_present indicates whether a program description record is referenced for the given start_time.

description_ID identifies the program description shown at the given start_time.

If desired, the data blocks in the IPG stream can be arranged such that description records are repeated at a lower rate than schedule/title data. One arrangement is to skip the description records in every other pass through the data. In another arrangement, the data is interleaved and organized with all of the schedule/title blocks being provided interleaved with a first half of the descriptions, and then all of the schedule/title blocks being transmitted interleaved with the second half of the description data. This format would repeat so that only half of the descriptions are sent at any one time with all of the schedule/title blocks.

Figure 4:
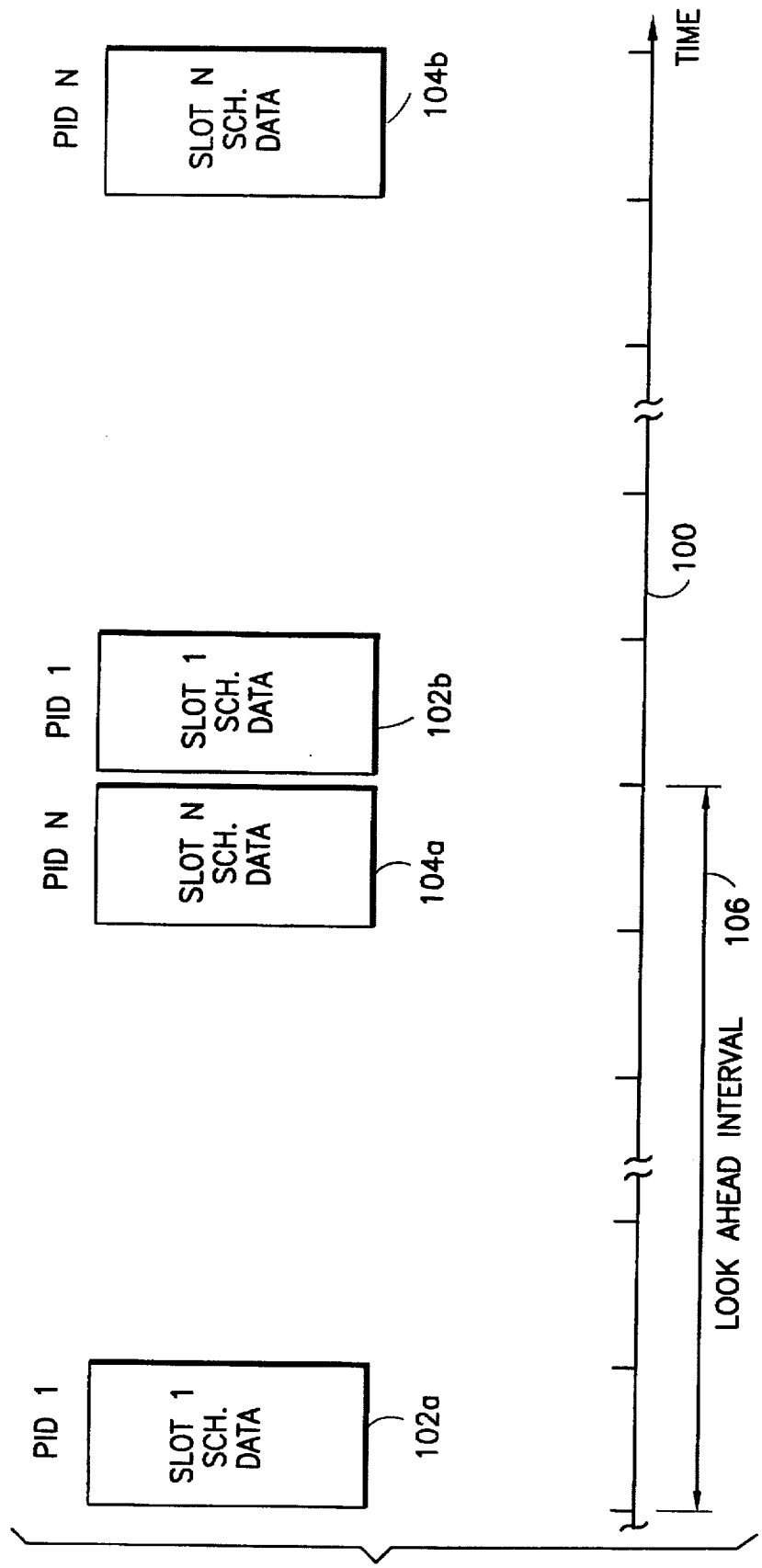
FIG. 4 is a diagrammatic illustration illustrating the labeling of schedule data for different time slots with unique PIDs for each look ahead interval.

FIG. 4 illustrates the arrangement of the IPG data over a look ahead interval. For example, the trickle data stream may contain scheduling information for a current 24 hour period and the demand data stream may contain information for the current period plus an additional six days to provide schedule information for a one week period. For the demand data stream, the look ahead interval 106 is therefore seven days. The seven day interval is broken down by time slots (e.g., two hours at a time) as indicated on time line 100. The schedule data is organized by slot. Thus, all of the schedule data for a first time slot is provided in a first page 102a which is identified by a unique PID (PID 1). Each successive page of data for each successive time slot will be identified by its own PID. The last slot in the look ahead interval is occupied by page 104a, having PID N.

The same format is used for the next seven day look ahead interval. The first slot of the next look ahead interval is occupied by page 102b, the packets of which are identified in the packet stream by PID 1. The last slot in the second look ahead interval illustrated in FIG. 4 is occupied by page 104b. The data packets carrying the scheduling information for page 104b are identified by PID N. This format continues indefinitely for successive look ahead intervals.

Figure 5:
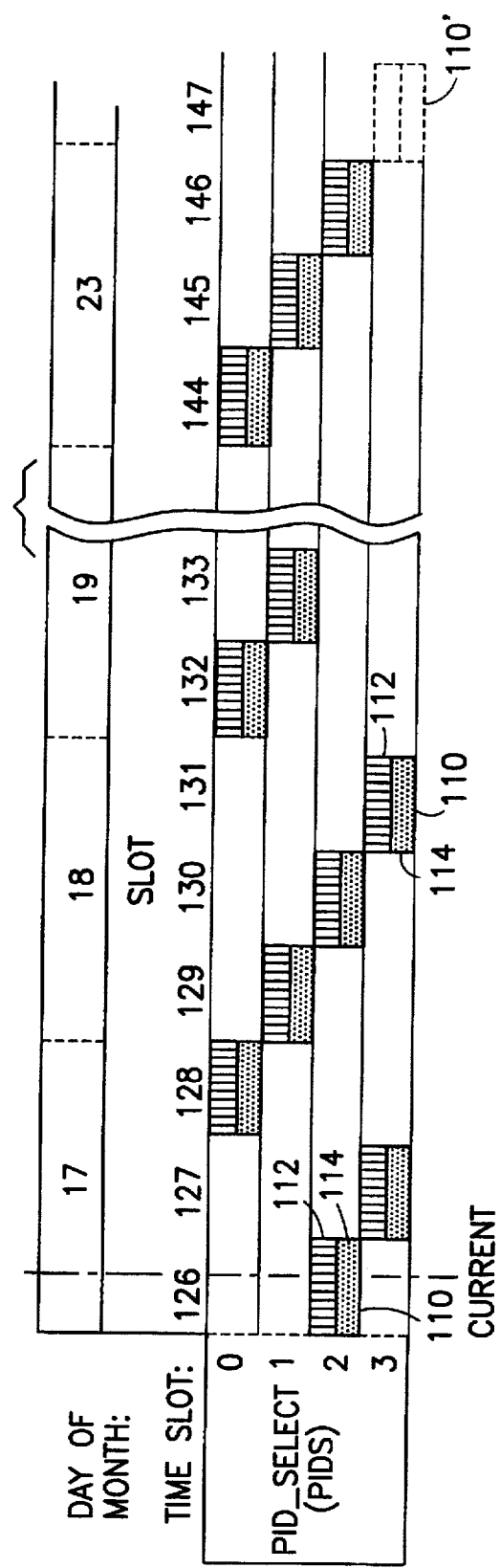
FIG. 5 is a diagrammatic illustration providing an example of how IPG data slots are assigned to PIDs to enable scheduling data to be provided at the interface between two consecutive time slots.

FIG. 5 illustrates a scheme for assigning IPG data slots to PID_select (PIDs). PID_select is used to select the PID in which a particular data block is to be transmitted to the decoder.

Slots containing timed IPG data blocks are numbered sequentially, e.g., starting at GPS day zero. In general, if N PIDs are to be used, the slots will be partitioned into groups of size N. The first slot in each N-slot group is assigned to PIDs 0 (i.e, PID_select=0). The second slot will be assigned to PIDs 1, and so on. FIG. 5 illustrates such an assignment with an example for four PIDs, an eight hour slot size and a 21 slot (i.e., one week) database look ahead. Each slot 110 contains both schedule/title data blocks 112 and description data blocks 114.

The IPG data slot to PIDs assignment illustrated in FIG. 5 always guarantees that two consecutive slots are assigned to two distinct PIDs. This is due to the staggered assignment of slots to the PIDs. As a result, the data acquisition/ processing task can be divided evenly between two PID processors (e.g., implemented in firmware in microprocessor 36-FIG. 2) in the event that two slots are required to compose a scheduling grid for display to a user. Further, in preparing for time transitions (e.g., at slot boundaries if the slot size is two hours, or at two hours into each slot if the slot size exceeds two hours), only two out of the N PIDs (assuming N>1) need to be updated by removing a past slot and adding a future slot.

Referring to FIG. 5, since the slot size (eight hours) is larger than two, the update is performed at two hours into slot 127 (i.e., at 10:00 a.m. on the seventeenth day of the month, with the current time falling in slot 126). This requires removing slot 126 from PIDs 2 and adding slot 147 to PIDs 3, as indicated at 110'. The other PIDs (PIDs 0 and 1 in slots 128, 129) remain intact, although versions may change for the data blocks in each PID. This approach allows smooth transitions to a new service definition at the transition times without disrupting the processing in the decoder.

It should now be appreciated that the present invention provides a method and apparatus for communicating and processing an interactive guide to events via an information network that carries various information services. An event listed in the interactive guide is available by subscribing to the information service that offers the event or by purchasing the event on an individual basis. The data for the interactive guide can be communicated in both a trickle data stream for current schedule information and a demand data stream for future schedule information. The current data from the trickle data stream is stored at the receiver for instantaneous retrieval. The demand data is cyclically provided in a high speed data stream for selective retrieval of schedule information for a time period of interest. Title and description records are transmitted separately so that title information can be retrieved from the demand data stream rapidly, with description information following at a slower pace if necessary to maintain data flow within the constraints of the system bandwidth and decoder memory resources. The scheduling data can be transmitted in a preformatted manner, to reduce the amount of processing necessary at the decoder.

The transmitted scheduling data can be provided in a packetized transport stream in which different categories of data are carried in different packet streams, each packet stream having its own packet identifier (PID). Prompt retrieval and processing of the scheduling data at the decoder is facilitated by providing individual pages from the scheduling database, organized by time slot, in the transmitted data stream with each page having its own PID. In this manner, when a user selects a time slot for which scheduling information is desired, the decoder need only locate the PIDs for that time slot and all of the necessary program guide information can be retrieved from the packets transmitted under that PID. A separate packet stream is provided for foundation data, under a PID identifying the data as foundation data.

Memory management at the decoder can allocate available memory resources to maintain instantaneous access to current schedule information provided by the trickle data stream, while allocating memory to the demand data stream on an as needed basis.

Although the invention has been described in connection with various preferred embodiments, it should be appreciated that numerous adaptations and modifications may be made thereto without departing from the spirit and scope of the invention as set forth in the claims.

We claim:

1. A decoder for providing an interactive program guide (IPG) from data received via an information network on which events listed in the program guide are available, comprising:

means for recovering IPG trickle data from said information network at a first data rate, said trickle data comprising current schedule information for a current time period for storage in a memory of said decoder and substantially instantaneous display at any time during said current time period;

means for selectively retrieving IPG demand data from said information network at a second data rate that is faster than said first data rate, said demand data being provided in pages and comprising future schedule information, each of said pages containing demand data for different future time slots for a future time period;

an interface for receiving a user command which designates a user-selected time period which is a subset of said future time period;

wherein said means for selectively retrieving is responsive to said user command for selectively retrieving only particular ones of said pages of demand data which correspond to said userselected time period; and means for storing said selectively retrieved pages of IPG demand data for display after the retrieval thereof from said information network.

2. A decoder in accordance with claim 1 wherein said IPG trickle data and IPG demand data is received from at least one packetized transport stream containing a succession of packets, the packets for said trickle data being identified by a first packet identifier (PID) and the packets for said pages of demand data being identified by at least one second PID.

3. A decoder in accordance with claim 2 wherein each of said pages of IPG demand data corresponds to a different time slot and has a unique PID.

4. A decoder in accordance with claim 2 wherein each page of IPG demand data corresponding to a different time slot has a unique page identifier, and a plurality of said pages is communicated under a common PID.

5. A decoder in accordance with claim 2 wherein each of said pages is carried in a separate packet stream having a unique PID for that page, said decoder further comprising:

a first PID processor for acquiring schedule information contained in a first page for a first time slot;

a second PID processor for acquiring schedule information contained in a second page for a second time slot that immediately follows said first time slot; and means for selectively combining a portion of schedule information acquired by said first PID processor with a portion of schedule information acquired by said second PID processor to provide a schedule of events available during a time period spanning said first and second time slots.

6. A decoder in accordance with claim 1 wherein for each event to be included in the interactive guide, said schedule information comprises a title record containing title information for that event and may optionally comprise a description record containing description information for that event, said decoder further comprising:

means for retrieving schedule records from said current and future schedule information, said schedule records containing title and description record identifiers cross-referencing the start time for an event with the title and description records provided for that event; and means responsive to said user command for selectively outputting title information for specific time slots and descriptions for specific programs based on information contained in said schedule records.

7. A decoder in accordance with claim 6, further comprising:

means for monitoring an amount of memory available in said storing means; and in the event that the amount of memory available is less than that required to store the title and description records for a time slot of interest, purging description records to make room for said title records in said storing means.

8. A decoder in accordance with claim 1 wherein said decoder memory is of a size sufficient to hold at least 24 hours of current schedule information and said trickle data provides schedule information for at least a full day of events at a time.

9. A decoder in accordance with claim 1, wherein:

said IPG trickle data is substantially continuously broadcast over said information network at said first data rate; and said IPG demand data is substantially continuously broadcast over said information network at said second data rate.

10. A method for providing an interactive program guide (IPG) from data received via an information network on which events listed in the program guide are available, comprising the steps of:

providing an IPG trickle data stream at a first data rate, said trickle data stream comprising current schedule information for a current time period for communication to and storage in a decoder to enable substantially instantaneous display of portions of said current schedule information on a display coupled to the decoder;

wherein said current schedule information is adapted to be automatically recovered and stored at said decoder without a user command to view said current schedule information;

providing an IPG demand data stream at a second data rate that is faster than said first data rate, said demand data being provided in pages and comprising future schedule information of a future time period, each of said pages containing demand data for at least one different future time slot, said second data rate being chosen to enable the selective acquisition and display of portions of said future schedule information on said display within a predetermined acquisition time limit;

wherein said portions of said future schedule information are adapted to be selectively acquired and displayed at said decoder in response to a user command to view said portions of said future schedule information;

said portions of said future schedule information corresponding to a user-selected time period which is a subset of said future time period; and transmitting said trickle data stream at said first rate and said demand data stream at said second rate over said information network for receipt by a population of decoders.

11. A method in accordance with claim 10 wherein said current and future schedule information is representative of information services and messages identifying events provided by particular information services at particular times, said method comprising the further step of:

sorting said schedule information by information service and message type for transmission to said decoders in a preformatted form, thereby facilitating the display of schedules by time slot at the decoders without performing said sorting at the decoder.

12. A method in accordance with claim 10 wherein for each event to be included in the interactive guide, said schedule information comprises a title record containing title information for that event and may optionally comprise a description record containing description information for that event, whereby the description information for an event can be processed at said decoders independently of the title information for that event.

13. A method in accordance with claim 12 comprising the further step of allocating the transmission of said title and description records within said demand data stream to communicate said title information at a higher rate than said description information.

14. A method in accordance with claim 10, wherein:

said IPG trickle data stream is substantially continuously broadcast over said information network at said first data rate; and said IPG demand data stream is substantially continuously broadcast over said information network at said second data rate.

15. A method for providing an interactive program guide (IPG) from data received at a decoder via an information network on which events listed in the program guide are available, comprising the steps of:

recovering IPG trickle data from said information network at a first data rate, said trickle data comprising current schedule information for a current time period for storage in a memory of said decoder and substantially instantaneous display at any time during said current time period;

selectively retrieving IPG demand data from said information network at a second data rate that is faster than said first data rate, said demand data being provided in pages and comprising future schedule information, each of said pages containing demand data for different future time slots for a future time period;

receiving a user command which designates a user-selected time period which is a subset of said future time period;

wherein said selectively retrieving step is responsive to said user command for selectively retrieving only particular ones of said pages of demand data which correspond to said user-selected time period; and storing said selectively retrieved pages of IPG demand data for display after the retrieval thereof from said information network.

16. A method in accordance with claim 15, wherein:

said IPG trickle data and IPG demand data is received from at least one packetized transport stream containing a succession of packets, the packets for said trickle data being identified by a first packet identifier (PID) and the packets for said pages of demand data being identified by at least one second PID.

17. A method in accordance with claim 16, wherein:

each of said pages of IPG demand data corresponds to a different time slot and has a unique PID.

18. A method in accordance with claim 16, wherein:

each page of IPG demand data corresponding to a different time slot has a unique page identifier, and a plurality of said pages is communicated under a common PID.

19. A method in accordance with claim 16, wherein each of said pages is carried in a separate packet stream having a unique PID for that page, comprising the further steps of:

acquiring schedule information contained in a first page for a first time slot according to a first PID thereof;

acquiring schedule information contained in a second page for a second time slot that immediately follows said first time slot according to a second PID thereof; and selectively combining a portion of schedule information from said first and second pages to provide a schedule of events available during a time period spanning said first and second time slots.

20. A method in accordance with claim 15, wherein for each event to be included in the interactive guide, said schedule information comprises a title record containing title information for that event and may optionally comprise a description record containing description information for that event, comprising the further steps of:

retrieving schedule records from said current and future schedule information, said schedule records containing title and description record identifiers cross-referencing the start time for an event with the title and description records provided for that event; and selectively outputting title information for specific time slots and descriptions for specific programs according to said user command and based on information contained in said schedule records.

21. A method in accordance with claim 20, comprising the further steps of:

monitoring an amount of memory available in said memory of said decoder; and purging description records in said memory of said decoder to make room for said title records in the event that said amount of memory available is less than that required to store the title and description records for a time slot of interest.

22. A method in accordance with claim 15, wherein:

said decoder memory is of a size sufficient to hold at least 24 hours of current schedule information and said trickle data provides schedule information for at least a full day of events at a time.

23. An apparatus for providing an interactive program guide (IPG) from data received via an information network on which events listed in the program guide are available, comprising:

means for providing an IPG trickle data stream at a first data rate, said trickle data stream comprising current schedule information for a current time period for communication to and storage in a decoder to enable substantially instantaneous display of portions of said current schedule information on a display coupled to the decoder;

wherein said current schedule information is adapted to be automatically recovered and stored at said decoder without a user command to view said current schedule information;

means for providing an IPG demand data stream at a second data rate that is faster than said first data rate, said demand data being provided in pages and comprising future schedule information of a future time period, each of said pages containing demand data for at least one different future time slot, said second data rate being chosen to enable the selective acquisition and display of portions of said future schedule information on said display within a predetermined acquisition time limit;

wherein said portions of said future schedule information are adapted to be selectively acquired and displayed at said decoder in response to a user command to view said portions of said future schedule information;

said portions of said future schedule information corresponding to a user-selected time period which is a subset of said future time period; and a transmitter for transmitting said trickle data stream at said first rate and said demand data stream at said second rate over said information network for receipt by a population of decoders.

24. An apparatus in accordance with claim 23, wherein said current and future schedule information is representative of information services and messages identifying events provided by particular information services at particular times, further comprising:

means for sorting said schedule information by information service and message type for transmission to said decoders in a preformatted form, thereby facilitating the display of schedules by time slot at the decoders without performing said sorting at the decoder.

25. An apparatus in accordance with claim 23, wherein:

for each event to be included in the interactive guide, said schedule information comprises a title record containing title information for that event and may optionally comprise a description record containing description information for that event, whereby the description information for an event can be processed at said decoders independently of the title information for that event.

26. An apparatus in accordance with claim 25, further comprising:

means for allocating the transmission of said title and description records within said demand data stream to communicate said title information at a higher rate than said description information.

* * * * *